(12) United States Patent
Sullivan

(10) Patent No.: US 10,611,312 B1
(45) Date of Patent: Apr. 7, 2020

(54) VEHICLE-MOUNTED CARRYING APPARATUS

(71) Applicant: Paul R. Sullivan, Austin, TX (US)

(72) Inventor: Paul R. Sullivan, Austin, TX (US)

( * ) Notice: Subject to any disclaimer, the term of this patent is extended or adjusted under 35 U.S.C. 154(b) by 0 days.

(21) Appl. No.: 16/277,512

(22) Filed: Feb. 15, 2019

Related U.S. Application Data

(60) Provisional application No. 62/631,448, filed on Feb. 15, 2018.

(51) Int. Cl.
| | | |
|---|---|---|
| *B60R 9/06* | (2006.01) | |
| *B60D 1/58* | (2006.01) | |
| *B60D 1/02* | (2006.01) | |
| *B60D 1/52* | (2006.01) | |
| *B60R 5/04* | (2006.01) | |
| *B60R 11/00* | (2006.01) | |

(52) U.S. Cl.
CPC .............. *B60R 9/06* (2013.01); *B60D 1/025* (2013.01); *B60D 1/52* (2013.01); *B60D 1/58* (2013.01); *B60R 5/04* (2013.01); *B60R 9/065* (2013.01); *B60R 2011/004* (2013.01)

(58) Field of Classification Search
CPC . B60R 9/06; B60R 9/065; B60N 3/103; B62J 7/08
USPC ........ 224/42.32, 42.37, 42.4, 519, 522, 523, 224/524, 531, 532, 533; 410/90, 91
See application file for complete search history.

(56) References Cited

U.S. PATENT DOCUMENTS

| | | | | |
|---|---|---|---|---|
| 3,618,795 A | * | 11/1971 | Burch | F27D 3/003 410/68 |
| 4,325,531 A | * | 4/1982 | Omholt | B62J 9/00 248/553 |
| 4,737,055 A | * | 4/1988 | Scully | B60P 7/13 114/75 |
| 4,744,590 A | | 5/1988 | Chesney | |
| 4,771,971 A | * | 9/1988 | Ludwig | B64G 1/641 165/104.33 |
| 4,805,859 A | * | 2/1989 | Hudson | A01K 97/06 224/406 |
| 4,974,765 A | * | 12/1990 | Marchetto | B62J 7/02 224/275 |
| 5,165,645 A | * | 11/1992 | Brown | B60N 3/103 248/310 |
| 5,368,209 A | | 11/1994 | Hill | |
| 5,586,702 A | | 12/1996 | Sadler | |
| 5,609,451 A | * | 3/1997 | McCorkle, Jr. | B60P 7/13 211/194 |
| D407,358 S | | 3/1999 | Redmond | |
| 6,053,563 A | * | 4/2000 | Edgeller | B62D 25/105 248/671 |

(Continued)

*Primary Examiner* — Justin M Larson
(74) *Attorney, Agent, or Firm* — Scheinberg & Associates, PC; Michael O. Scheinberg

(57) ABSTRACT

A cargo carrier is removably attachable to a trailer hitch on a vehicle. Multiple support arms are attached to a center hitch arm, with a locating pin protruding from the outer end of some or all of the support arms, and wherein there are at least two locating pins. The arrangement of the locating pins is configured to correspond to an arrangement of holes in the bottom of an object to be carried. Some embodiments support the weight of the object at small regions surrounding each locating pin. Some embodiments support the weight of the object over the spans of the support arms. Various locating pin arrangements enable carrying of different objects.

24 Claims, 9 Drawing Sheets

(56) References Cited

U.S. PATENT DOCUMENTS

| | | | |
|---|---|---|---|
| D446,755 S | 8/2001 | Adams et al. | |
| 6,302,051 B1 * | 10/2001 | Hemmingson | B63B 25/002 114/343 |
| 6,491,485 B2 * | 12/2002 | Zavitz | B61D 45/00 410/35 |
| 6,666,362 B1 * | 12/2003 | LeTrudet | B60P 7/13 224/42.4 |
| 6,712,248 B2 | 3/2004 | Mitchell | |
| 6,755,428 B2 * | 6/2004 | Butler | A45C 9/00 224/547 |
| D527,028 S | 8/2006 | Ford | |
| 7,905,508 B2 | 3/2011 | Crawford et al. | |
| 8,097,359 B2 * | 1/2012 | Gau | H01M 2/1005 429/187 |
| 8,646,669 B2 * | 2/2014 | Mann | B62J 9/001 224/413 |
| 8,695,386 B2 * | 4/2014 | Schulz | E05G 1/005 109/50 |
| 8,820,598 B2 * | 9/2014 | Tennyson | B60R 9/065 224/509 |
| 8,857,688 B1 | 10/2014 | Bell | |
| D744,382 S | 12/2015 | Woller et al. | |
| 9,415,787 B2 | 8/2016 | Mericle | |
| D772,764 S | 11/2016 | Thurber et al. | |
| 10,131,371 B2 * | 11/2018 | Camarco | B60R 9/06 |
| 2003/0057245 A1 | 3/2003 | Dean | |
| 2004/0173654 A1 | 9/2004 | McAlister | |
| 2006/0118586 A1 | 6/2006 | Heravi | |
| 2007/0175938 A1 | 8/2007 | Swenson | |
| 2008/0099522 A1 | 5/2008 | Clausen et al. | |
| 2009/0152314 A1 | 6/2009 | Myrex | |
| 2010/0051627 A1 | 3/2010 | Kucks et al. | |
| 2014/0054299 A1 | 2/2014 | Kamin et al. | |
| 2017/0197648 A1 | 7/2017 | Rackleff et al. | |
| 2017/0349196 A1 | 12/2017 | Camarco et al. | |
| 2018/0340356 A1 * | 11/2018 | Brennan | E05B 73/00 |
| 2019/0315519 A1 * | 10/2019 | Brennan | B63B 17/00 |

* cited by examiner

VEHICLE-MOUNTED CARRYING APPARATUS

TECHNICAL FIELD

The present invention relates to a carrying apparatus for attachment to a vehicle.

BACKGROUND

Carriers are used on vehicles for transporting items that will not fit in the vehicle or which are more conveniently carried outside the vehicle. Even when there is room within a vehicle for an object, carrying an object on a hitch-mounted carrier facilitates access to the object. For example, when a cooler is positioned on a hitch-mounted carrier, the cooler contents are more available for people at a tailgating party.

Various hitch-mounted carriers are known. For example, U.S. Pat. No. 5,368,209 to Hill for a "Vehicle Cargo Attachment Support" describes a flat hitch-mounted carrier having a rectilinear frame, perforated floor, and a second mounting tube, orthogonal to the first mounting tube, to mount the carrier when it is not in use and being transported. A container cover latches to the rectilinear frame to secure the items being carried. U.S. Pat. No. 5,586,702 to Sadler for a "Vehicle Cargo Carrier" shows a hitch-mounted rectilinear frame that supports a cargo enclosure for carrying objects. U.S. Pat. No. 8,857,688 to Bell, III for a "Collapsible Hitch Mounted Cargo Carrier" describes a collapsible carrier that includes arms that unfold to produce a base and fold upward at the ends to form side walls. U.S. Design Pat. No. D527,028 to Ford for a "Dual Carrier for Spreaders" describes a hitch-mounted carrier that supports two spreaders.

Some carriers use an enclosed container or cage to contain carried items. Some carriers include a lower surface or floor and use a raised rim or wall to retain carried items.

SUMMARY

A vehicle-mounted carrying apparatus according to embodiments provides a simple, rugged, and reliable carrier for on a vehicle.

A carrier comprises: multiple support arms; and multiple first mating structures, each first mating structure attached to one of the multiple support arms, in which an arrangement of the first mating members corresponds to an arrangement of complementary second mating structures in the bottom of an object to be carried. Some embodiments include a hitch arm dimensioned for being received into a receiver of a vehicle trailer hitch onto which the multiple support arms are attached.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION

In some embodiments, the carrier is configured to carry a cooler in an accessible location outside of the vehicle so that the cooler is not taking up space within the vehicle. Some embodiments include theft-deterrent features that prevent the carrier and the cooler from being stolen from the back of the vehicle.

Figure 1:
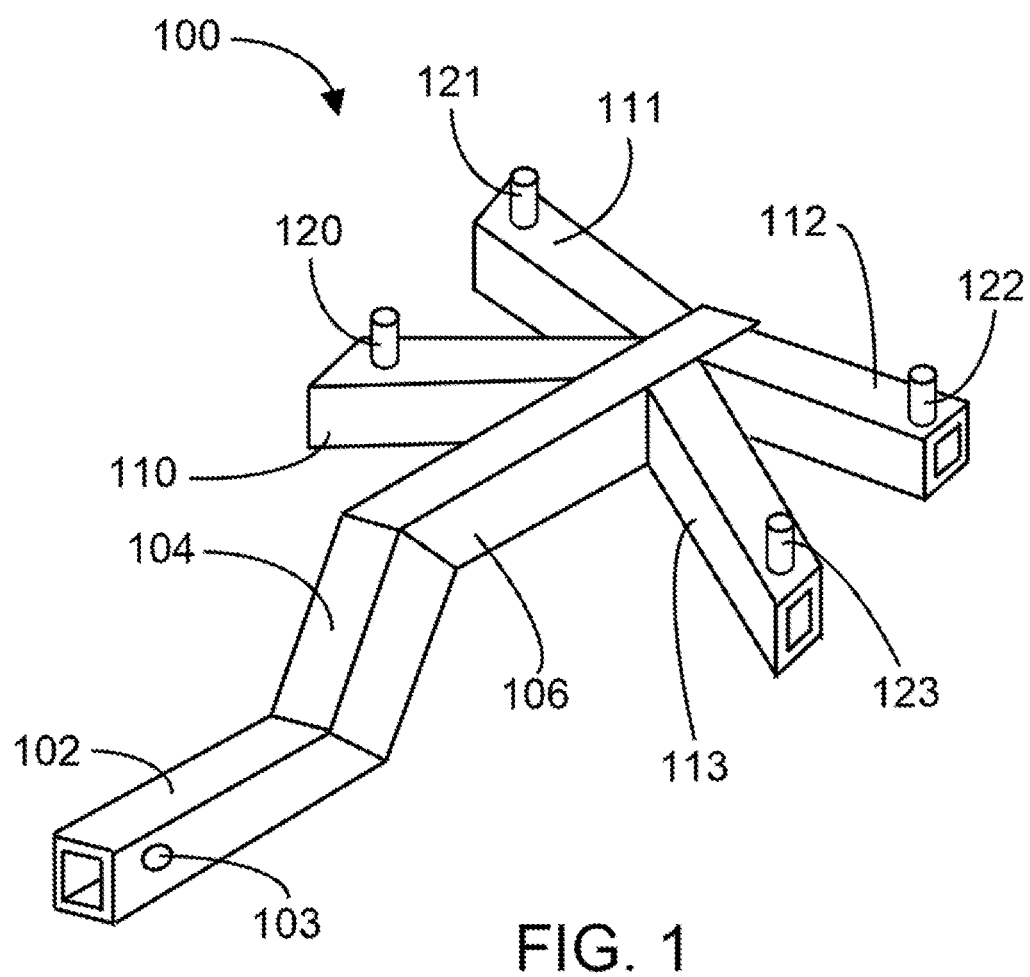
FIG. 1 is an isometric view of a hitch-mounted carrying apparatus.

FIG. 1 is an isometric view of a hitch-mounted carrier 100. A central hitch arm structure, comprising a hitch section 102, a center section 104 and a support section 106, essentially forms a center "spine" for the apparatus. A "hitch axis direction" is defined by the longitudinal axis of hitch section 102 and of support section 106. The hitch section 102 has holes 103 to accommodate a locking pin to maintain hitch section 102 securely inside the vehicle receiver hitch. Hitch section 102 typically has a square cross section and is dimensioned to fit within a 1¼ inch or a 2" receiver.

Multiple support arms 110-113 are attached to support section 106, typically by welding, brazing, or with bolts or screws. Support arms 110-113 typically extend in a direction that is not parallel to hitch section 102. As shown in FIG. 1, support arms 110-113 extend sideways at an angle on both sides of support section 106 and typically in both forward and rearward directions. Other arrangement of support arms could be used. For example, the support arms could form a rectangle that is attached to support section 106. Some support arms may be attached directly to support section 106, while other support arms may be attached to other support arms. Each support arm 110-113 has a first mating structure, such as a locating pin, attached, and extending upwards from a location near the outer end of each support arm 110-113. Most Yeti Tundra coolers and other similar coolers have rubber feet at each corner on the bottom. The feet have indentions or holes which are sufficiently deep to function as the corresponding second mating structures and receive the locating pins on the support arms. Pin 120 is shown attached near the outer end (i.e., the end away from support section 106) of support arm 110, pin 121 is attached near the outer end of support arm 111, pin 122 is attached near the outer end of support arm 112, and pin 123 is attached near the outer end of support arm x113. Although four support arms 110-113 (and four locating pins 120-123) are shown in FIG. 1, other numbers of support arms and pins fall within the scope of the invention. In some embodiments, one or more of support arms 110-113 may not include a locating pin, wherein these support arms only provide vertical support for the object being carried. In general, mechanical considerations indicate that a minimum of two locating pins would be required to provide adequate X-Y locating (i.e., in the two horizontal directions) of the object being carried, as well as rotational locating (i.e., around a vertical axis with rotation of the carried object in a horizontal plane). Typically, a minimum of three support arms may be required to provide adequate vertical support for objects being carried. Although an object to be carried may have a number, N, of holes in a lower surface (see FIG. 3, where N=4), it is not necessary to provide a locating pin for all N holes to provide adequate X-Y and rotational locating of the object as discussed above.

As can be seen from FIG. 1, the carrier lacks a floor and lacks a rim around the outside of the carrier. By "floor" is meant an area covered by a sold or perforated material, upon which objects can rest and that provides continuous support over the area of the floor. By "rim" is meant an elevated portion around a substantial portion of the perimeter of the carrier that prevents objects from sliding off the carrier. A "rim" does not need to be solid across the entire perimeter. For example, U.S. Pat. No. 8,857,688 describes a rim composed of second arms 60 that extend above the floor in multiple places around the perimeter. A preferred carrier also lacks side walls extending above the bottom of the carrier and lacks side walls extending along the perimeter of the carrier to keep an object in the carrier. While support arms support an object to be carried, they are not a floor. The area of the support surfaces, that is, the area of the upper surface of the support arms, is much less than the area of the bottom of the object to be carried. The support area of the support arms is typically less than 50% of the area of the bottom of the object to be carried. The contact area between the object to be carried is less than or equal to the upper surface area of the support arms. A preferred hitch mounted carrier does not support the object to be carried along its entire bottom or along the perimeter of the bottom—the object is supported at most only on the top surface area of the support arms. The bottom of the object need not sit directly on the support arms or be supported by the entire top surface—the carrier can include protrusions or bosses that hold the object above the top surface of the support arms, or the object can include protrusions or bosses that rest on the carrier, rather than the entire bottom of the object resting on the carrier.

Figure 2:
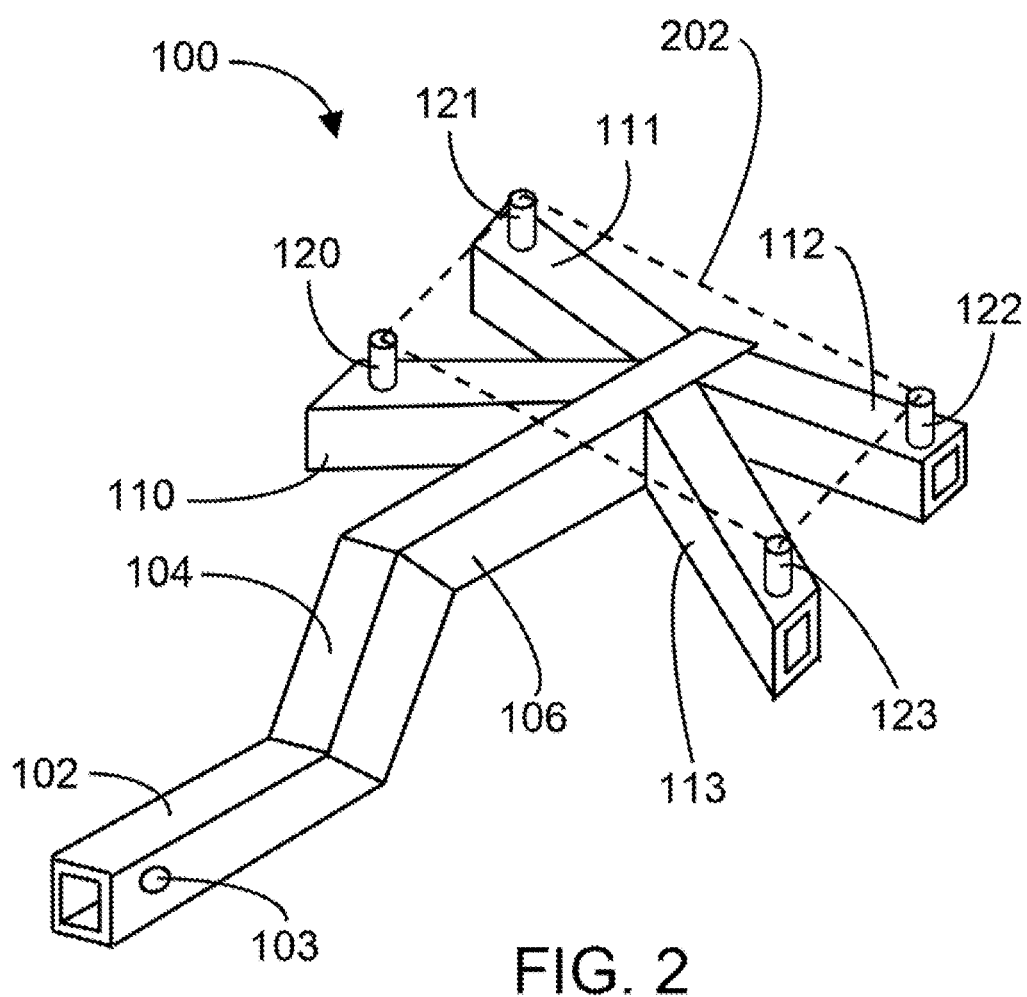
FIG. 2 is an isometric view of the hitch-mounted carrying apparatus of FIG. 1, illustrating the locating pin arrangement.

FIG. 2 is an isometric view of a hitch-mounted carrying apparatus 100 illustrating the locating pin arrangement. All 100-series callouts are the same as in FIG. 1, however now the locating pin arrangement 202 is illustrated by dashed lines extending between each pair of pins in the set of pins 120-123. As described in FIG. 1, although four support arms with four pins (one pin for each support arm) are illustrated, other numbers of support arms (typically 3, 5, 6, . . . ) fall within the scope of the invention. The geometry of the locating pin arrangement 202 may be square, rectangular, trapezoidal, triangular, or polygonal. The corners of locating pin arrangement 202 define the locations for each locating pin, such as locating pins 120-123 illustrated here. The corresponding second mating structures in the object to be carried are arranged in the same pattern.

Figure 3:
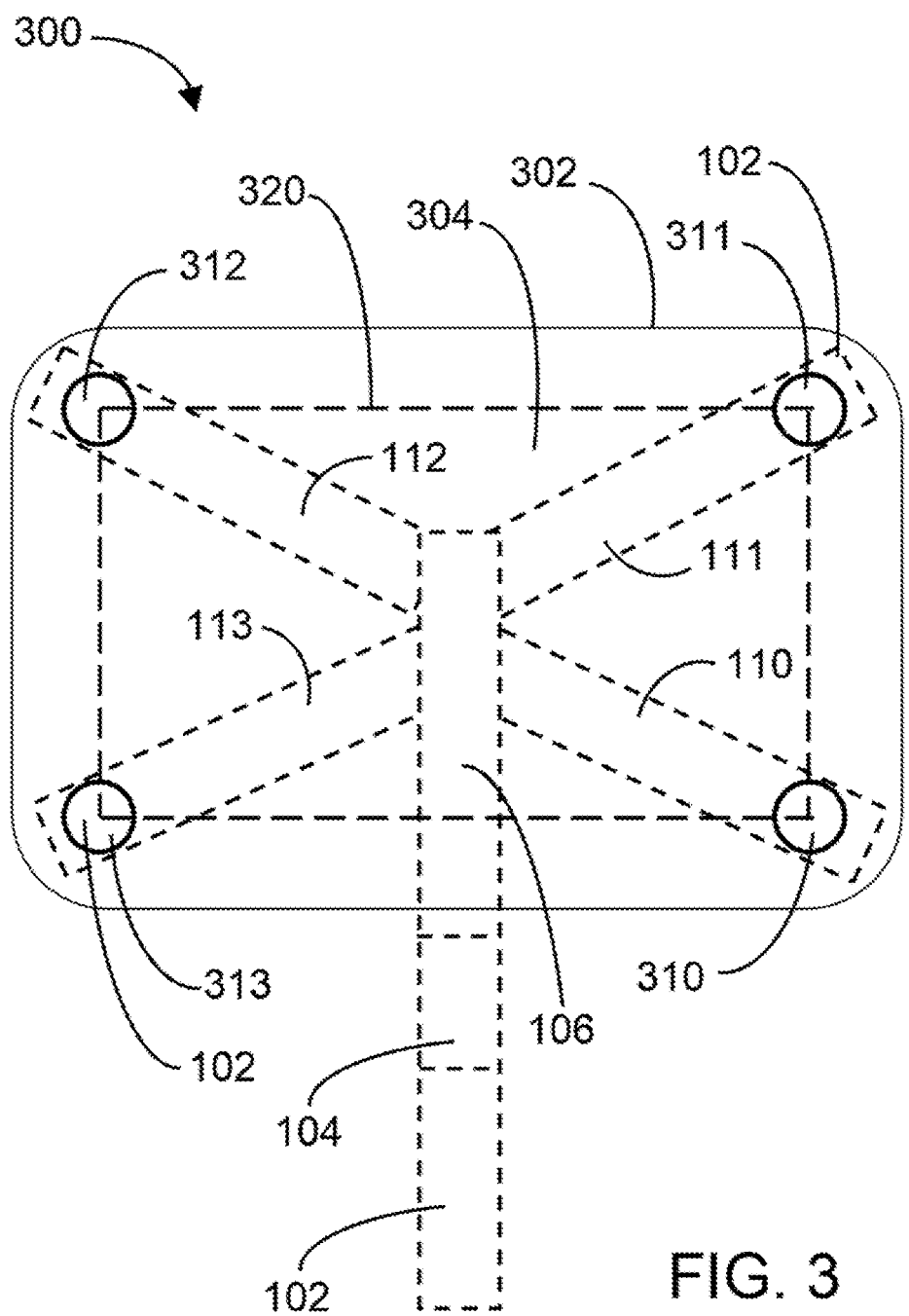
FIG. 3 shows a bottom view of a typical object which could be carried by embodiments.

FIG. 3 shows a bottom view of a typical object 300 which could be carried by embodiments, while the hitch-mounted carrying apparatus is shown as short-dashed lines. The 100-series callouts are the same as in FIGS. 1 and 2. The carried object 300 has an outer wall 302 and a bottom surface 304. Carried object 300 includes complementary second mating structures in its bottom that mate with the first mating structures of the hitch-mounted carrier. For the carried object 300 illustrated here, the second complementary mating structures are four holes 310-313 with an arrangement 320, indicated by long-dashed lines extending between holes 310-313. The hole arrangement 320 may be matched to the locating pin arrangement 202 (not shown in FIG. 3—see FIG. 2).

As described above, the weight of carried object 300 may be carried in some embodiments over the upper surfaces of support arms 110-113. In other embodiments, the weight of carried object 320 may be carried by small areas (typically circular) of support arms 110-113 surrounding locating pins 120-123 (e.g., using weight-bearing spotfaces or bosses). The embodiment illustrated in FIG. 3 is configured so that when the object has been loaded into the hitch-mounted carrying apparatus, the outer wall 302 is outside of the outer ends of support arms 110-113, thereby providing protection against injury to passersby from rubbing against any exposed ends of support arms 110-113. For rectangular objects to be carried, the dimensions of the rectangular hole arrangement may typically be in a range of 10 to 20 inches for a first side, and in a range of 20 to 35 inches for the perpendicular side.

Figure 4:
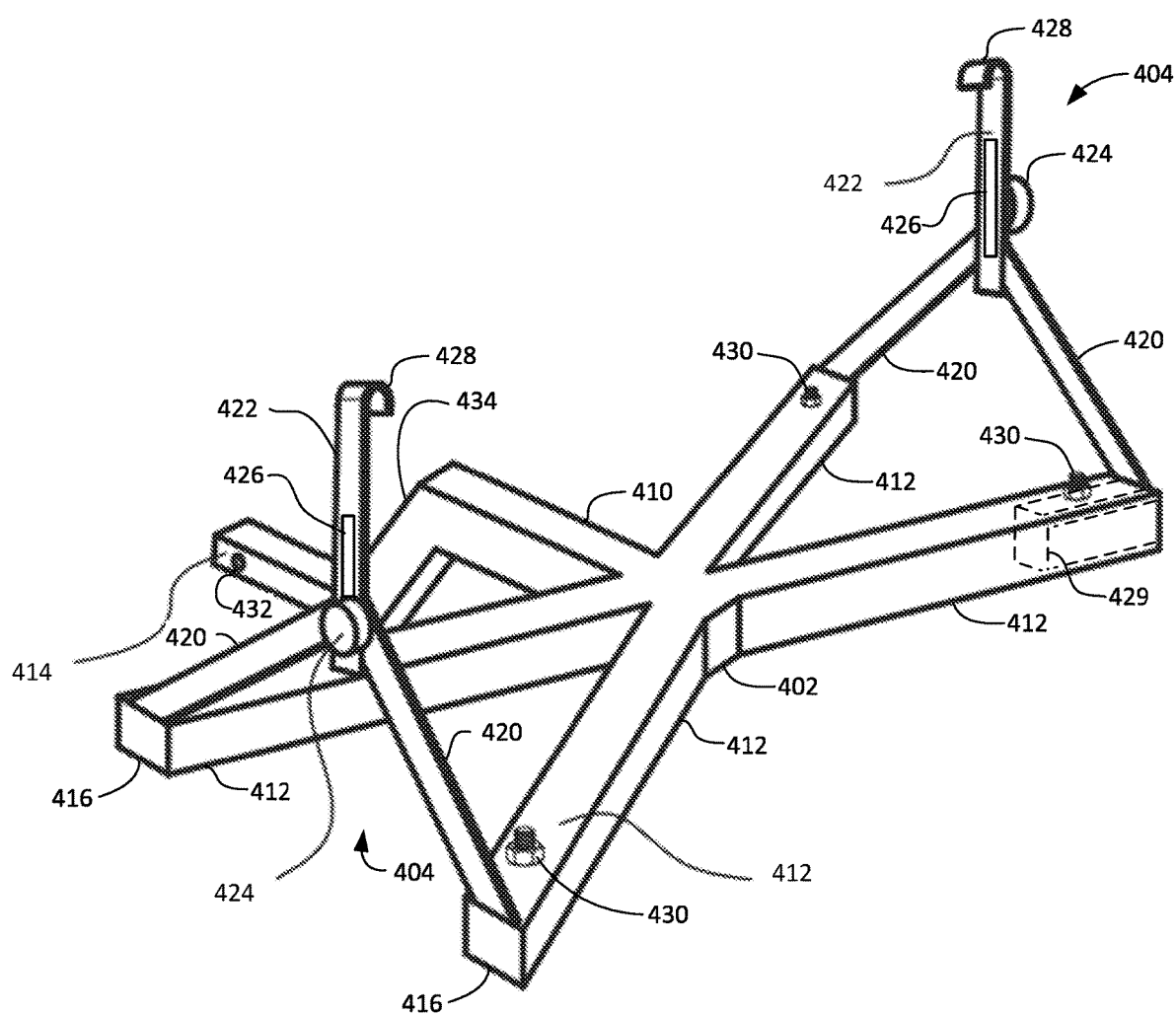
FIG. 4 shows another embodiment of a carrier.
Figure 5A:
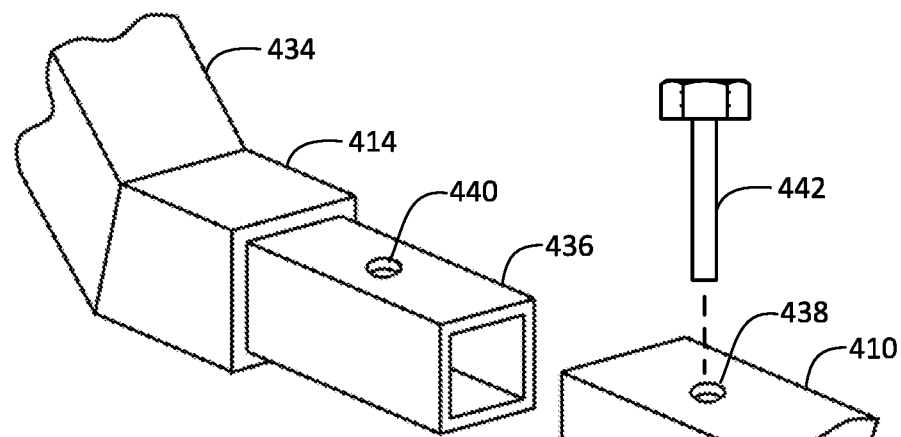
FIG. 5A-5D show an enlarged, partial view of a hitch base and a center portion of the carrier of FIG. 4.
Figure 5B:
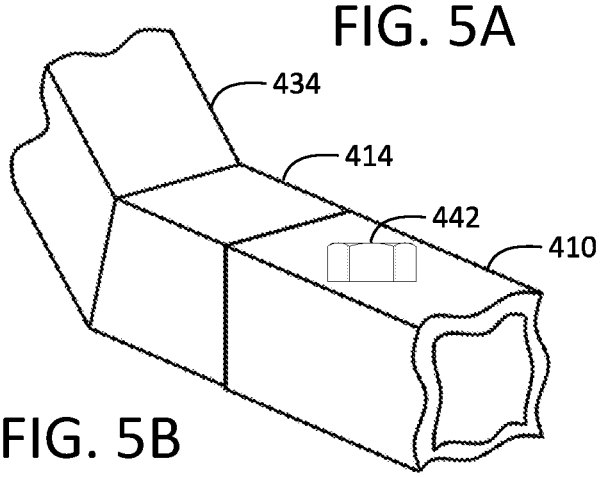
Figure 5C:
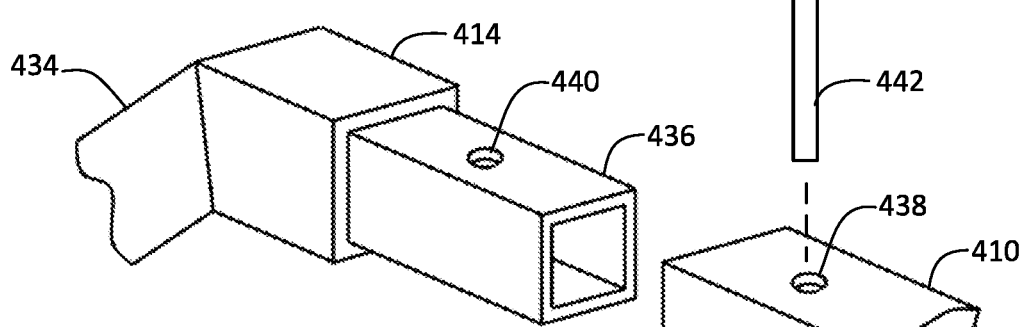
Figure 5D:
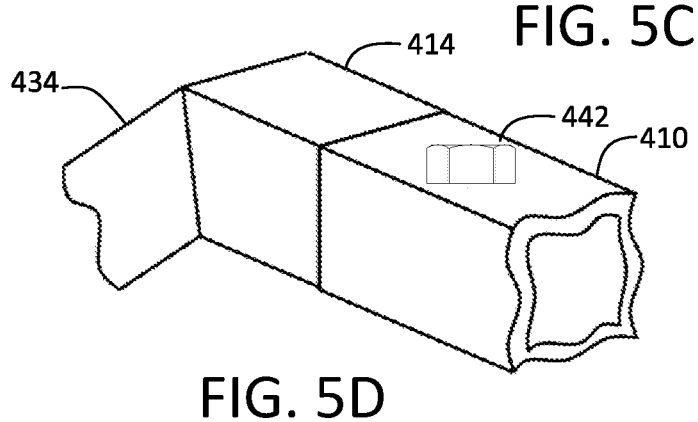

FIG. 4 shows a carrier 400 that is adapted to carry a Yeti Tundra 75 Cooler. Carrier 400 includes optional includes theft-deterrent features. Carrier 400 includes an X-shaped frame 402, typically composed of square tubing, and a side support assembly 404 on each side of the X-shaped frame 402. The frame includes a center portion 410, four support arms 412 that form the "X," and a hitch base 414. Each side support assembly 404 includes end caps 416, two angled support 420, a tie down bracket 422, and a tightening knob 424. Tie down bracket 422 includes a slot 426 and a hook 428. Each end cap 416 include an extension portion 429 (one example shown in dotted lines on FIG. 4) that extend into the support arms of the x-shaped frame. The extension portion 429 is similar to, and functions the same as, the extension portion 436 of the hitch base as described below and shown in FIGS. 5A through 5C. The locating pins 430 pass through the extension portion to secure the side support assembly 404 to x-shaped frame 402.

Protruding from the X-shaped frame 402 are four location pins 430, each located toward the end of one of support arms 412. Location pins 430 mate with holes in the bottom of the cooler. The holes in the cooler are typically within an elastomeric pad portion, that is, the "feet," near the corners on the bottom of the cooler.

Near the end of hitch base 414 is a hole 432 that extends through opposing walls of the hitch base tubing. The hole 432 in the tubing wall on one side is threaded, and the hole in the tubing on the opposing wall has a slightly larger diameter, so that a bolt can be inserted through the larger hole, pass through the receiver, and then be threaded into the threaded hole in the tubing on the opposite side. To install the carrier 400 onto the vehicle, the hitch base 414 is inserted into the receiver, and a bolt (not shown) is inserted into the larger hole, through holes in the receiver, and is tightened into the threads on the opposite side of the hitch base tube. The carrier 400 is then securely and rigidly attached to the vehicle.

Optionally, a keyed lock mechanism is mounted onto the portion of the bolt extending through the hitch portion to prevent theft by preventing the removal of the bolt. The keyed lock mechanism preferably includes a protective cap that protects the lock from contamination from the road.

Optionally, the hitch base 414 includes an angled portion 434 that raises the height of the x-shaped frame, preferably about six inches above the receiver. In some embodiments, the hitch base 414 is detachable from the support portion 410, allowing the hitch base portion to be flipped over so that instead of a six-inch rise, there is a six-inch drop between the receiver and the x-shaped frame. Whether a user configures the hitch base to provide a rise or a drop depends on the height above the ground of the receiver on the vehicle. For example, in a vehicle with a lifted rear end or a 4×4, the receiver may be higher up and a six-inch drop. The hitch base is configured to provide either a rise or a drop, to position the cooler at a convenient working height for users to access the contents of the cooler.

As shown in FIG. 5, hitch base 414 can include, at the end that connects to center portion 410, a smaller diameter tube 436 that extends from hitch base 414 and can be inserted into center portion 410. The top wall of center potion 410 includes a hole 438 and the tube of hitch base 414 include a hole 440 through which a bolt 442 can be inserted. The bottom wall of the center potion 410 includes a threaded hole to which the bolt 442 can be threaded to secure the hitch portion to the support portion. When a cooler is mounted onto the carrier, bolt 442 is covered by the cooler and is inaccessible, so bolt locking mechanism is typically unnecessary used at this location.

Each locating pin 430 preferably include a threaded portion that screws into the corresponding support arm 412, and an extension portion which projects upward from the x-shaped frame, for mating with a corresponding hole in the cooler. The extension portion is preferably covered by a plastic or other soft material to prevent damage to the cooler. A nut threaded onto the threaded portion prior to screwing the threaded portion into the support arm is used to tighten the positioning pin at the desired position. The locating pins stabilize the cooler without the additional weight of a rim around the cooler. The locating pins are not limited to any particular design or method of attaching the positioning pins to the support arms.

Tightening knob 424 includes a grippable knob portion and a bolt portion extending from the grippable knob portion. The bolt portion passes through a slot in the into tie-down bracket 422 and is threaded into the of the angled supports 420 or into a nut welded onto one of the angled supports 420. When tightening knob 424 is loosened, tie down bracket 422 is free to swing down out of the way or to swing up and to extend so that the hook portion can be inserted in to a mating groove under the lid of the cooler. The tie down bracket 422 is then shifted downward slightly so that the hook engages the groove in the cooler, and the grippable knob is turned until the tie down bracket 422 is tightly cinched against the angled supports, thereby securing the cooler onto the carrier. The tightening knob 424 includes a locking mechanism, which when locked, disengages the grippable knob from the bolt, so that turning the grippable knob will turn freely and not loosen or tighten the tie down bracket 422. Thus, when locked, the tie down bracket cannot be disengaged from the cooler, thereby preventing theft of the cooler. Both lockable knobs are preferable keyed alike and keyed to the same key as the hitch pin lock, so that a user can use a use a single key to mount the carrier onto the vehicle and to lock the cooler to the carrier.

Figure 6:
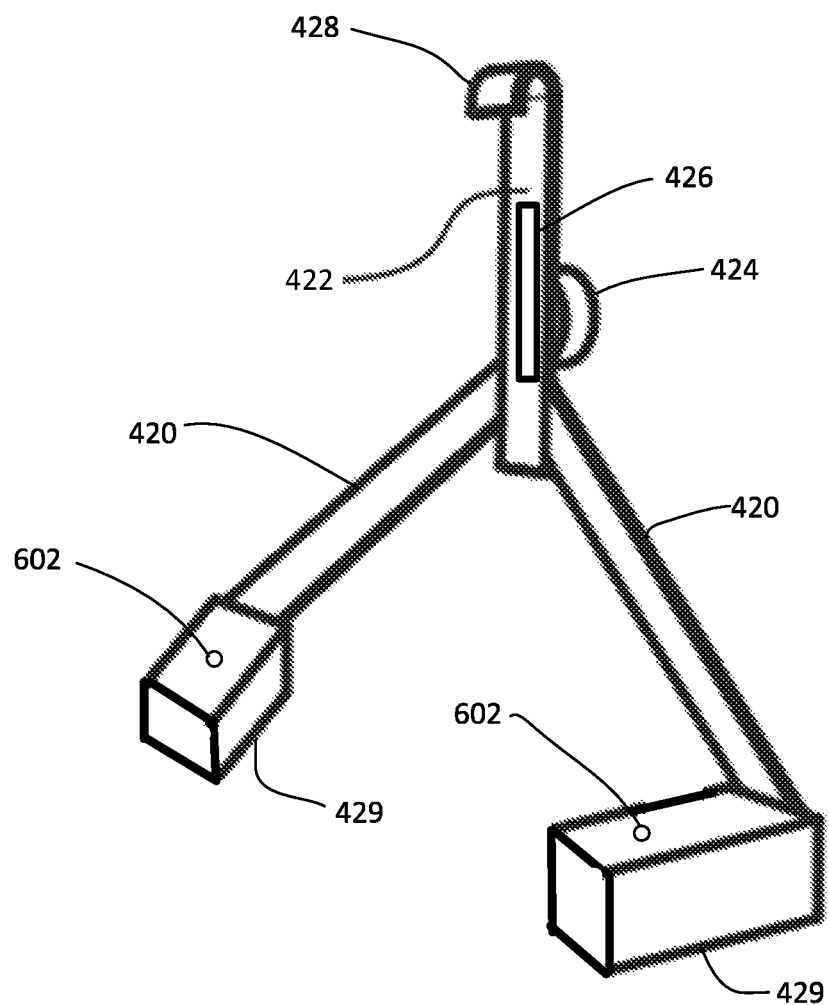
FIG. 6 shows an enlarge view of the side support assembly of FIG. 4.

The embodiment described above provides a secure attachment of the cooler to the carrier and of the carrier to the vehicle. Through the use of known, commercially available hitch accessories, a hitch can be provided that allows the carrier to swing out of the way to allow a vehicle tailgate or rear door to open FIG. 6 shows an enlarged view of side support assembly 404. Extensions 429 are visible, as is the hole 602 in extensions 429. A portion of each the locating pin 430 extends through hole 602, through a matching hole in the bottom of the tube, and is threaded into the corresponding support member 412, to secure the side support assembly 404 to the x-shaped frame 402.

Figure 7:
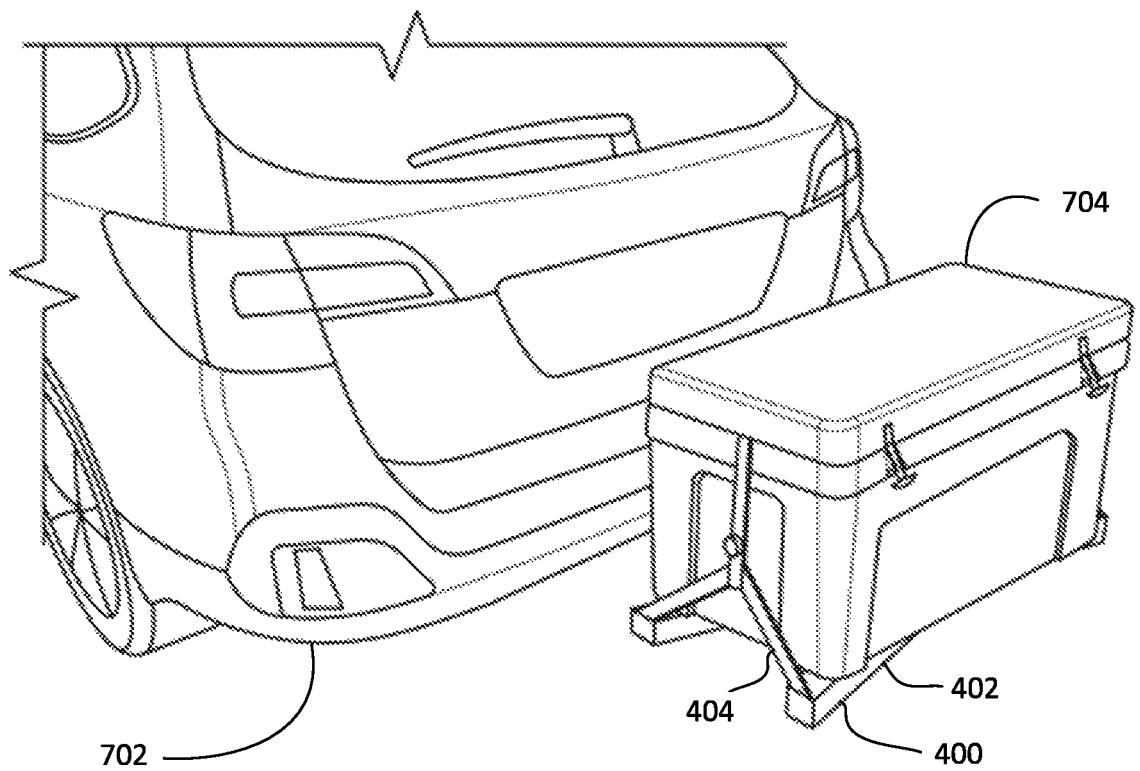
FIG. 7 shows the carrier of FIG. 4 mounted on a vehicle and a cooler mounted on the carrier.

FIG. 7 shows a carrier 400 mounted onto a vehicle 702. A cooler 704 is secured by side support assembly 404 on x-shaped frame 402.

Figure 8:
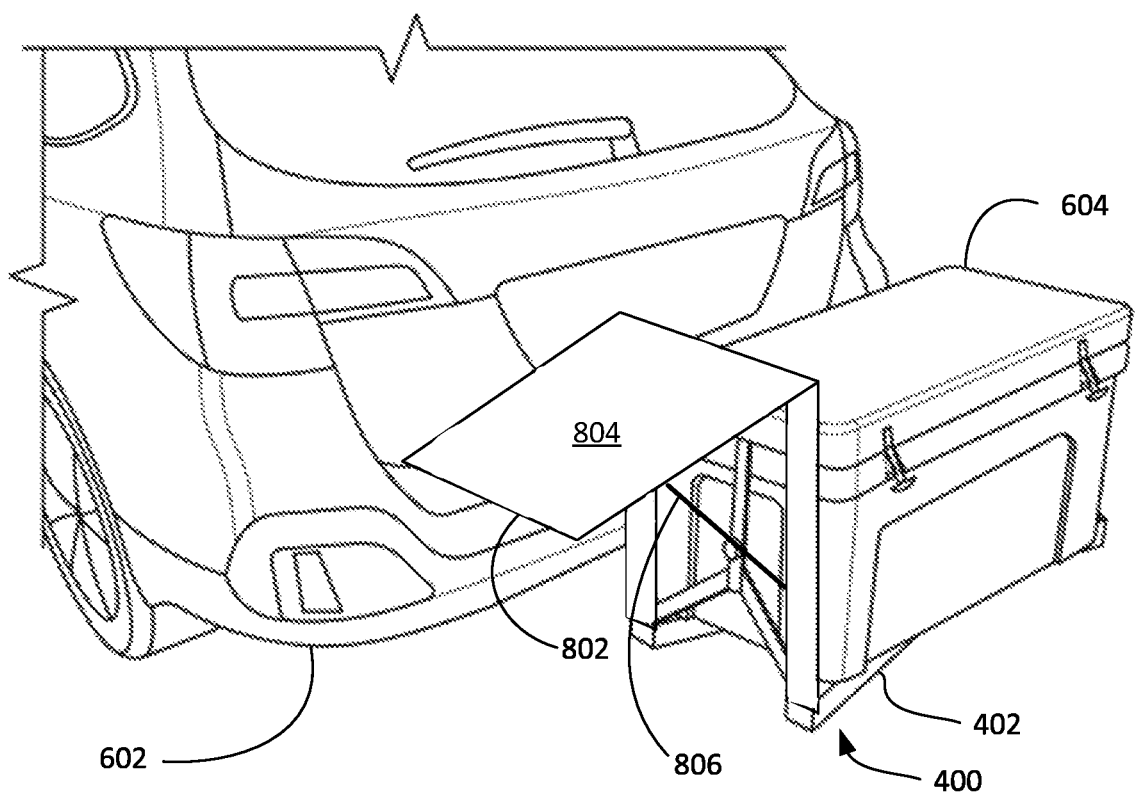
FIG. 8 shows a food preparation table mounted onto the carrier of FIG. 4.

The locating pins 430 that engage with extensions 429 to secure the side support assembly 404 can also be used to support other accessories having extensions 429. For example, FIG. 8 shows a food preparation table 802 attached to extensions portions 429 (not visible) to be supported by x-shaped frame 402 and secured by the locating pins 430. The food preparation table 802 can have a hinged top work surface 804 that folds out of the way during transport, and a folding brace 806 to support the table 802 when in use. An accessory can incorporate a side support assembly 404 to secure the cooler during transport, or the side support assembly can be removed and replaced by the accessory.

Figure 9:
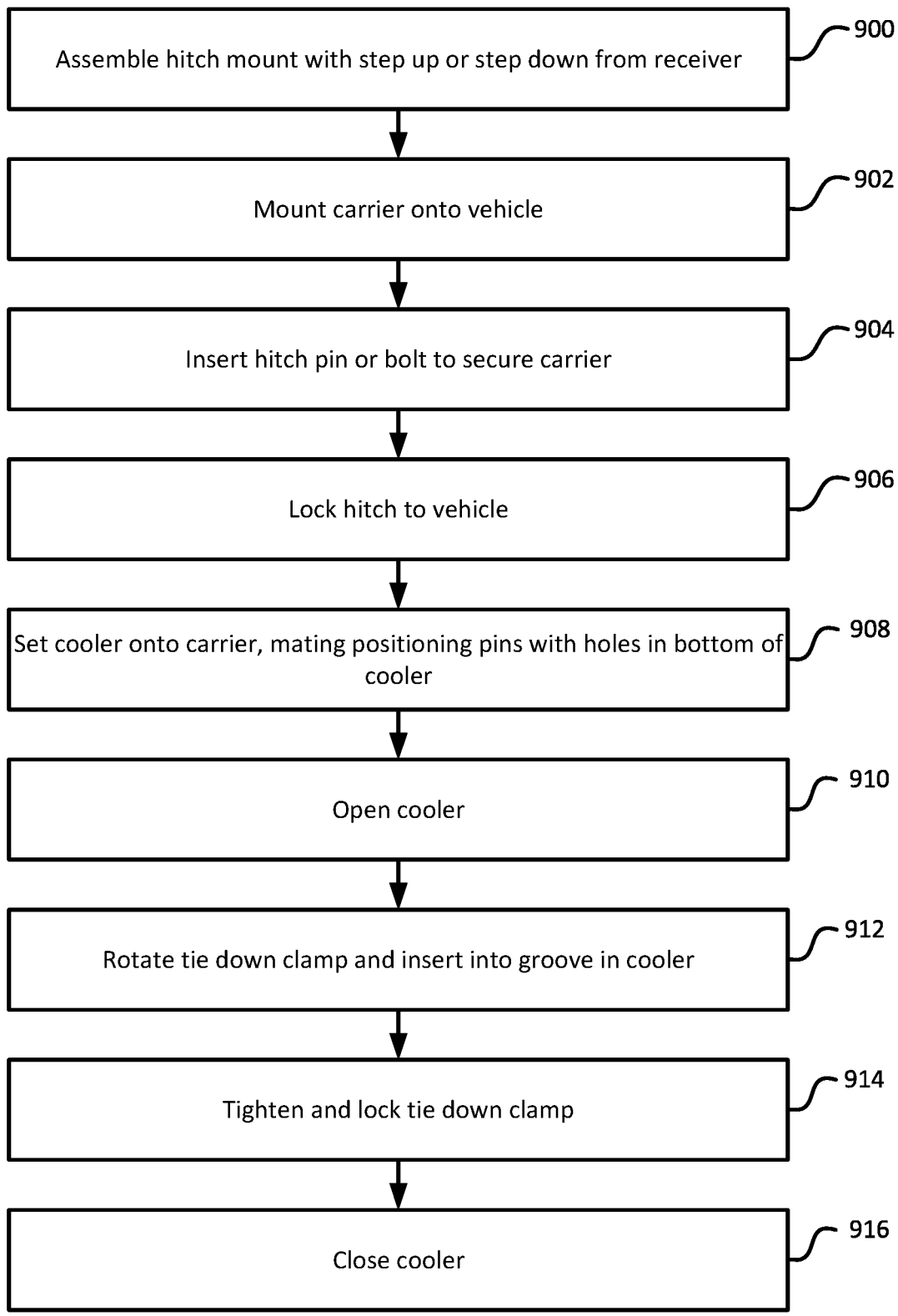
FIG. 9 is a flow chart showing a process for using the carrier of FIG. 4.

FIG. 9 shows a flow chart of a method of mounting a cooler onto a vehicle. In step 900, the hitch mount is assembled with a step up or a step down, depending on the distance from the ground of the receiver on the vehicle. In step 902, the carrier as described above is mounted onto the vehicle by inserting the hitch base into the receiver. In step 904, a hitch pin is inserted through the hitch base and the receiver and secured. The hitch pin can be, for example, a simple hitch pin secured by a cotter pin or a bolt that passes through one side of the hitch base and threads into the opposing side of the hitch base tube. In optional step 906, a lock is attached to the hitch pin to deter theft.

In step 908, a cooler or other object is mounted onto the carrier, with the locating pins of the carrier mating with holes in the bottom of the carrier or other object. In step 910, the cooler is opened. In step 912, a tie down claim is rotated up and the hook on the tie down clamp is inserted into a mating groove in the cooler. In step 914, the tie down clamp is locked in place by tightening a tightening knob and locked. In step 920, the lid of the cooler is closed and secured. Steps other than step 902 are optional.

Even without the side support assembly and the tie-down bracket, the positioning pins preferably engage the cooler to a sufficient depth that the weight of cooler maintains the cooler stably attached to the carrier.

While the description above describes the carrier as holding a cooler, the carrier is not limited to carrying any particular object. Similarly, the mating structures on the carrier and the object to be carried are not limited to locating pins and holes. The invention is not limited to a hitch mounted carrier and also could be used, for example, as a carrier in a truck bed.

When the description above described a threaded tube wall, it will be recognized that a threaded nut attached to the outside of the tube could also be used.

While the foregoing describes a preferred embodiment of the present invention, one skilled in the art will appreciate that various changes, substitutions and alterations may be made without departing from the scope of the invention.

Although the present invention and its advantages have been described in detail, it should be understood that various changes, substitutions and alterations may be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A hitch-mounted carrier for carrying a cooler, comprising:
    a tubular hitch base having a first end portion dimensioned for being received into a receiver of a vehicle trailer hitch;
    a tubular center portion connected to the tubular hitch base;
    an x-shaped frame including four support arms supported by the tubular center portion;
    multiple locating pins, one support pin extending from each of the four support arms, each locating pin including an extension portion extending above the x-shaped frame and a threaded portion securing the locating pin to the corresponding support arm; and
    two side support assemblies, one on each side of the x-shaped frame, each side support assembly including:
        a tie down bracket for securing the cooler onto the carrier;
        a knob for tightening or loosening the tie down bracket; and
        two extension portions, each extension portion extending into one of the support arms and being secured in the one of the support arms by the threaded portion of the corresponding locating pin.

2. The hitch-mounted carrier of claim 1 in which the knob includes a keyed lock that prevents the tightening or loosening of the tie down bracket when the knob is locked.

3. A hitch-mounted carrier, comprising:
    a hitch arm structure, a first end portion of which is dimensioned for being received into a receiver of a vehicle trailer hitch, and defining a hitch axis direction;
    multiple support arms extending away from the hitch arm structure in directions not parallel to hitch axis direction; and
    multiple locating pins, each locating pin being attached to a support arm;
    in which:
        an arrangement of the locating pins is configured to correspond to an arrangement of holes in the bottom of an object to be carried; and
        the carrier lacks a floor area and lacks a rim surrounding the floor area.

4. The hitch-mounted carrier of claim 3 in which the multiple support arms are attached directly to the hitch arm structure.

5. The hitch-mounted carrier of claim 3 in which at least one of the multiple support arms is attached to another one of the multiple support arms.

6. A hitch-mounted carrier comprising:
    a hitch arm dimensioned for being received into a receiver of a vehicle trailer hitch;
    multiple support arms supported by the hitch arm; and
    multiple locating pins, each of the locating pins being attached to one of the multiple support arms;
    in which an arrangement of the first mating members corresponds to an arrangement of complementary second mating structures in the bottom of an object to be carried, the locating pins capable of sliding into the second mounting structures.

7. The hitch-mounted carrier of claim 6, in which the hitch-mounted carrier lacks a rim for retaining the object carried.

8. The hitch-mounted carrier of claim 6 in which at least two of the multiple support arms extend from the hitch arm and are not parallel to the hitch arm.

9. The hitch-mounted carrier of claim 6 in which each locating pin, when engaged with the corresponding second mating structure, fixes the position of the object to be carried in two dimensions.

10. The hitch-mounted carrier of claim 7, in which the hitch-mounted carrier lacks a floor for supporting the bottom of the object to be carried and having an area larger than the area of the bottom of the object to be carried.

11. The hitch-mounted carrier of claim 6 in which the contact area between the hitch mounted carrier and the bottom of the object is less than or equal to the area of the support arms.

12. The hitch-mounted carrier of claim 6 in which the contact area between the hitch mounted carrier and the bottom of the object to be carried is less than 50 percent of the area of the bottom of the object.

13. The hitch-mounted carrier of claim 6 in which the hitch-mounted carrier lacks sides extending above the bottom of the object to be carried.

14. The hitch-mounted carrier of claim 6 in which the hitch-mounted carrier does not support the object to be carried along the entire perimeter of its bottom.

15. The hitch-mounted carrier of claim 6, the hitch arm has a square cross section and is dimensioned to fit within a 1¼ inch or a 2" receiver.

16. The hitch-mounted carrier of claim 6 in which:
    the object to be carried comprises a cooler; and
    the complementary second mating structures comprise holes in the bottom of the cooler.

17. The hitch-mounted carrier of claim 6 in which the locating pins are attached to the support arms sufficiently close to the ends of the support arms such that, when the object is being carried by the hitch-mounted carrier, the ends of the support arms do not protrude beyond the object being carried.

18. The hitch-mounted carrier of claim 6 in which the support arms are configured to contact the bottom of the object to be carried.

19. The hitch-mounted carrier of claim 6, further comprising bosses surround the locating pins, the bosses configured to support the object to be carried.

20. The hitch-mounted carrier of claim 6 in which the multiple support arms comprise three, four, five, or six support arms; and wherein the multiple locating pins comprise two, three, four, five or six locating pins.

21. The hitch-mounted carrier of claim 6, in which the support arms are attached directly to the hitch arm.

22. A method of supporting an object on a vehicle, the method comprising:
    providing a hitch-mounted carrier in accordance with claim 6;

inserting the hitch arm into a receiver hitch mounted on the vehicle;

providing a cooler having second mating structures in the bottom;

positioning the cooler on the hitch mount carrier such that the locating pins mate with the corresponding ones of the second mating structures.

23. The method of claim 22 in which the second mating structures comprise holes, and in which positioning the cooler on the hitch mounted carrier comprises positioning the holes in the cooler onto the locating pins in the carrier.

24. The hitch-mounted carrier of claim 6, further comprising at least one tie down bracket for securing the object onto the carrier.

* * * * *